(12) United States Patent
Vasudevan et al.

(10) Patent No.: US 7,929,537 B2
(45) Date of Patent: Apr. 19, 2011

(54) METHODS FOR ACCESS CONTROL IN FEMTO SYSTEMS

(75) Inventors: Subramanian Vasudevan, Morristown, NJ (US); Jialin Zou, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 789 days.

(21) Appl. No.: 11/907,458

(22) Filed: Oct. 12, 2007

(65) Prior Publication Data

US 2009/0097436 A1 Apr. 16, 2009

(51) Int. Cl.
*H04L 12/28* (2006.01)
*H04L 12/56* (2006.01)
*H04W 4/00* (2009.01)

(52) U.S. Cl. ......... 370/392; 370/329; 370/341; 370/431

(58) Field of Classification Search .................. 370/328, 370/329, 340, 341, 389, 392, 431
See application file for complete search history.

(56) References Cited

U.S. PATENT DOCUMENTS

| | | | |
|---|---|---|---|
| 5,548,816 A | 8/1996 | Devaney | |
| 7,103,662 B2 | 9/2006 | Ray et al. | |
| 2004/0266445 A1 | 12/2004 | Burgess et al. | |
| 2005/0227693 A1 | 10/2005 | Kong et al. | |
| 2007/0097939 A1 | 5/2007 | Nylander et al. | |
| 2007/0140185 A1 | 6/2007 | Garg et al. | |
| 2007/0160008 A1 | 7/2007 | Burgess | |
| 2007/0183427 A1 | 8/2007 | Nylander et al. | |
| 2007/0197220 A1 | 8/2007 | Willey | |

FOREIGN PATENT DOCUMENTS

| | | |
|---|---|---|
| EP | 1 608 187 | 12/2005 |
| EP | 1 657 949 | 5/2006 |
| WO | WO 93/23965 | 11/1993 |
| WO | WO 00/28770 | 5/2000 |
| WO | WO 01/67786 | 9/2001 |
| WO | WO 2006/094253 | 9/2006 |
| WO | WO 2007/040449 | 4/2007 |

OTHER PUBLICATIONS

"cdma2000 High Rate Packet Data Air Interface Specification," $3^{rd}$ Generation Partnership Project 2 "3GPP2," Version 2.0, Mar. 2007.

(Continued)

*Primary Examiner* — Ronald Abelson
(74) *Attorney, Agent, or Firm* — Harness, Dickey & Pierce (57) ABSTRACT

In a method for controlling access to wireless resources provided by femto cells within a femto subnet a femto management system or radio access network may control access to femto cells within the femto subnet by assigning at least one hashing class mask of a first-type or hashing class mask of a second-type to a wireless user. The hashing class mask of the first-type or hashing of the second-type class mask may be assigned based on whether the wireless user is authorized to access a first femto cell within the femto subnet. The hashing class mask of the first-type provides access to at least one first femto cell within the femto subnet.

22 Claims, 5 Drawing Sheets

OTHER PUBLICATIONS

Kim et al., "An Efficient Paging Scheme for Overlaid Microcell/Macrocell Systems," Universal Personal Communications, vol. 2, pp. 961-964, Sep. 29, 1996.

International Search Report dated Feb. 16, 2009 for International Application No. PCT/US2008/011553.

Written Opinion dated Feb. 16, 2009 for International Application No. PCT/US2008/011553.

International Search Report dated Mar. 11, 2009 for International Application No. PCT/US2008/011461. Written Opinion dated Mar. 11, 2009 for International Application No. PCT/US2008/011461.

International Search Report dated Mar. 25, 2009 for International Application No. PCT/US2008/011345.

Written Opinion dated Mar. 25, 2009 for International Application No. PCT/US2008/011345.

International Preliminary Report on Patentability dated Apr. 22, 2010 for PCT/US2008/011553.

International Preliminary Report on Patentability dated Apr. 22, 2010 for PCT/US2008/011345.

International Preliminary Report on Patentability dated Apr. 22, 2010 for PCT/US2008/011461.

METHODS FOR ACCESS CONTROL IN FEMTO SYSTEMS

BACKGROUND OF THE INVENTION

A femto base station is basically a low cost and low power base station (BS) transceiver which is installed indoors (e.g., in a home or office) and connected to the Internet via cable, DSL, on-premise fiber optic link, or a similar IP backhaul technology. This connection is used to integrate the femto base station with the WAN wireless operator's core network.

A femto base station serves a geographic area known as a femto cell over a single carrier or channel. A femto cell typically covers a smaller geographic area or subscriber constituency than a conventional macro cell. For example, femto base stations typically provide radio coverage in geographical areas such as one or more buildings or homes, whereas conventional macro base stations provide radio coverage in larger areas such as an entire cities or towns. The function of femto cells is similar to that of a Wireless LAN (Local Area Network). It provides the operators a low cost solution for coverage extension and for offloading users from the cellular network.

A femto base station is typically installed by an end user rather than a network operator. When a femto base station is installed to enhance local coverage, for example, in a home, the femto base station should be dedicated to the home because the wireless resources are provided, installed and/or paid for by the end user. In such cases, only mobile stations associated with the home or authorized by the end user should be allowed to access the femto base station.

Conventionally, a radio access network (RAN) may prioritize user access to wireless resources within a cell (femto or macro) using initial configuration parameters and sector-parameters, which will be described in more detail below. However, no mechanism for preventing unauthorized users from tying up wireless resources provided by the femto cells. Consequently, an end user may be denied access in view of the femto base station being preoccupied with serving unauthorized users.

A mobile station receives the above-mentioned initial configuration parameters from a radio access network (RAN) during session configuration (e.g., at power up). Session configuration is typically triggered in response to, for example, a universal access terminal identification (UATI) request from the mobile station. The initial configuration parameters are sent via a traffic channel.

In the current 3GPP2 CDMA2000 EVDO standard "cdma2000 High Rate Packet Data Air Interface Specification," 3GPP2 C.S0024-B, Ver. 2.0 (March 2007), the initial configuration parameters may include a class mask along with other parameters. As is well-known, a class mask is indicative of a priority class of the mobile station. Methods for assigning class masks are well-known in the art, and thus, a detailed discussion will be omitted for the sake of brevity. After completing session configuration, the mobile station may stay in a connected state or enter an idle state.

After entering an idle state, the mobile station periodically wakes up and receives broadcast overhead messages such as a sector-parameters message on the broadcast control channel. In the above-described current 3GPP2 CDMA2000 EVDO standard, sector-parameters include, for example, a channel mask, a trigger code and one or more color codes. As is well-known, channel masks are assigned by and maintained in the RAN. Channel masks indicate channels used for communication within a particular cell. Each channel may be associated with a particular priority class of users within the RAN.

Upon receiving a channel mask in a sector-parameters message, the mobile station performs a hashing calculation using its assigned class mask to determine which channels the mobile station is authorized to use. The mobile station then hashes on (or randomly selects) a channel through which to access the wireless resources provided by the newly entered cell. The access hashing mechanism supported in current standards only takes effect when there is more than one carrier (channel) supported by a particular base station. If only one carrier is supported by the base station, any mobile of any priority class may gain access to the carrier.

As is well-known, different cells may broadcast different channel masks. Consequently, when the mobile station moves from a femto cell to a macro cell or vice versa, the channel mask received by the mobile station changes. Upon receiving a new or different channel mask, the mobile station performs another hashing calculation to determine which channels the mobile station is authorized to hash on and use. The mobile station then hashes on an authorized channel through which to access the wireless resources provided the newly entered cell.

In a more particular example, assume a mobile station entering a macro cell is a low priority user and there exists five candidate channels allocated to the macro cell. Three of the candidate channels are associated with the low priority class of the mobile station, and two of the candidate channels are associated with a higher priority class. By performing the well-known hashing calculation using its assigned class mask and the channel masks broadcast by the cell, the mobile station determines that the three low priority channels are the only channels on which the mobile station is entitled to access. The mobile station then hashes on (or randomly selects) one of the three low priority channels through which to access the wireless network.

Using this conventional mechanism in a femto cell with a single carrier, however, users are not entirely denied access because only a single carrier exists. Thus, users entitled to use of wireless resources in the femto cell may be denied in favor of users not entitled to use of the resources.

SUMMARY OF THE INVENTION

In the same femto environment, a portion of the femto cells may be public and a portion may be private. Private femto cells may be those femto cells owned by an end user or company.

Exemplary embodiments provide methods for controlling access to private femto cells in a femto subnet.

Exemplary embodiments may reduce the likelihood that authorized users are denied access to private femto cells they are authorized to access.

At least one illustrative embodiment provides a method for controlling access to wireless resources provided by femto cells within a femto subnet. In this method, the radio access network may establish a hashing channel mask of a first-type and a hashing class mask of the first-type for each first femto cell within the femto subnet. Each hashing class mask of the first-type provides access to at least one corresponding first femto cell within the femto subnet. The radio access network may assign a hashing class mask of the first-type or a hashing class mask of the second-type to a wireless user based on whether the wireless user is authorized to access a first femto cell within the femto subnet. The hashing class mask of the first-type may be a private hashing class mask, the hashing channel mask of the first-type may be a private hashing channel mask, the hashing class mask of the second-type may be a public hashing class mask and the first femto cell may be a private femto cell.

A private channel (or carrier) associated with the private channel hashing mask may be the only channel transmitted and supported by the private femto base stations corresponding to the private femto cells. The public hashing channel mask may be the globally common channel mask defined for general public access. The channel associated with the public channel hashing mask may be a channel of the nearest publicly accessible base station over which users may access wireless resources. The nearby publicly accessible cell may be a femto cell or macro cell. If there is no public access channel available in the area, a dummy channel may be assigned to the public access mask and broadcast by the private femto base station.

In at least one other illustrative embodiment, the radio access network may establish a private hashing mask pair for a private femto cell. The private hashing mask pair may include a private hashing channel mask and corresponding private hashing class mask. The radio access network may also provide a public hashing channel mask for the private femto cell. The private hashing mask pair and the public channel hashing mask may be stored in association with identification information for the femto cell within the radio access network. One of the private class hashing mask and a public class hashing mask may be assigned to a wireless user.

Another illustrative embodiment provides a method for restricting access to a private femto cell in a femto subnet. In this method, the femto management system may determine whether a user authorized to access the private femto cell is present in the femto subnet, and restrict access to the private femto cell by assigning a null hashing channel mask to the private femto cell.

In another illustrative embodiment, the radio access network may establish a private hashing channel mask and hashing class mask for each private femto cell within each femto subnet of a femto system. Each private hashing class mask may provide access to at least one corresponding private femto cell. A plurality of the hashing class masks may be assigned to a wireless user. Each of the plurality of hashing class masks may be associated with a femto subnet within a femto system. The assigned hashing class masks may be stored in association with corresponding femto subnet identifiers. The assigned hashing class masks and corresponding femto subnet identifiers may be sent to the wireless user.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes such as a femto management system (FMS).

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As discussed herein, the term "user" may be considered synonymous to, and used interchangeably with, the term "mobile station."

Figure 1:
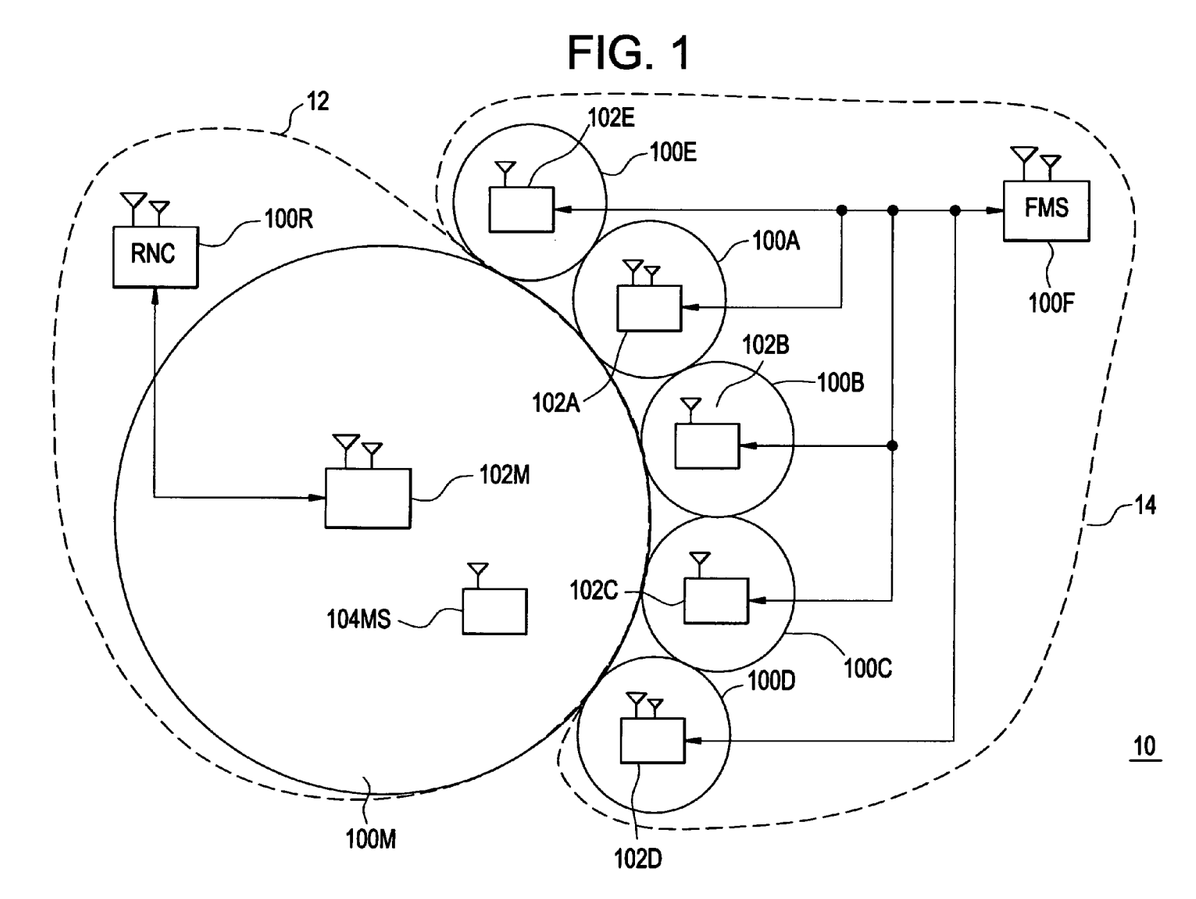
FIG. 1 illustrates a portion of a telecommunications system.

FIG. 1 illustrates a portion of a telecommunications system in which illustrative embodiments may be implemented. The telecommunications system 10 includes a radio access network (RAN) including a macro subnet 12 and a femto subnet 14, each of which have different coverage areas.

The RAN shown in FIG. 1, by way of non-limiting example, is shown as a code division multiple access radio access network (CDMA RAN). In a CDMA RAN, radio access is preferably based upon Code Division Multiple Access (CDMA) with individual radio channels allocated using CDMA spreading codes. Of course, other access methods may be employed.

The macro subnet 12 may include a RAN control node 100R. The RAN control node 100R may be, for example, a radio network controller (RNC) in a hierarchical network architecture or a session reference network controller (SRNC) in a flat network. The RAN control node 100R may be linked with a macro base station 102M via one or more packet and/or circuit switched networks (e.g., one or more Internet Protocol (IP) networks or the like). The macro base station 102M may also constitute part of the macro system 12.

The macro base station 102M provides radio coverage in macro cell 100M. Each macro cell is identified by a unique identity, which is broadcast within the cell.

The femto subnet 14 may include a femto management system (FMS) 100F. The FMS 100F is analogous to and has the same functionality as a RAN control node in a macro cellular system. Because such functionality is well-known, a detailed discussion will be omitted for the sake of brevity.

The FMS 100F may maintain a separate link with each of a plurality of femto base stations 102A-102E via one or more packet and/or circuit switched networks (e.g., one or more Internet Protocol (IP) networks or the like). The femto base stations 102A-102E may also constitute part of the femto subnet 14.

The femto base stations 102A-102E provide radio coverage in respective femto cells 100A-100E. Each of cells 100A-100E is identified by a unique identity, which is broadcast within the cell. As used herein, the phrase "femto base station" may be synonymous with "pico base station," or "micro base station."

The nodes 100F, 100A-100E and 102A-102E are termed FMS, femto cells and femto base stations, respectively, in keeping with the CDMA RAN example. However, it should be understood that the term radio network controller and base station also encompasses nodes having similar functionality for other types of radio access networks.

Other types of telecommunications systems which encompass other types of radio access networks include the following: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; Worldwide Interoperability for Microwave Access (WiMAX); ultra mobile broadband (UMB); and long term evolution (LTE).

For the sake of example, FIG. 1 shows only a single RAN control node 100R, FMS 100F, six femto base stations 102A, 102B, 102C, 102D, 102E, a single 102M macro base station, and a single mobile station 104MS. However, it will be understood that RANs may include any number of RAN control nodes, FMSs, base stations (femto and macro), which serve any number of mobile stations.

Referring still to FIG. 1, as is well-known, mobile station 104MS communicates with one or more of base stations 102A-102E and/or 102M over an air interface. The mobile station 104MS may be, for example, a mobile telephone ("cellular" telephone), a portable computer, pocket computer, hand-held computer, a personal digital assistant (PDA), a car-mounted mobile device or the like, which communicates voice and/or data with the RAN.

As discussed above, in the same femto environment, a portion of the femto cells may be public and a portion may be private. Private femto cells may be those femto cells owned by an end user or company. Illustrative embodiments discussed herein provide methods for controlling access to wireless resources in a private femto cell. Public femto cells may be femto cells open to access by the general public, and not restricted to a single user or group of users.

Illustrative embodiments will be described herein with regard to the telecommunications network shown in FIG. 1. Particularly, illustrative embodiments will be described assuming that femto cells 100A-100D are private femto cells, whereas femto cell 100E is a public femto cell. In this example, femto cell 100A is a private femto cell accessible only by user A (not shown), femto cell 100B is a private femto cell accessible only by user B (not shown), femto cell 100C is a private femto cell only accessible by user C (not shown) and femto cell 100D is a private femto cell only accessible by a group of users D.

Figure 2:
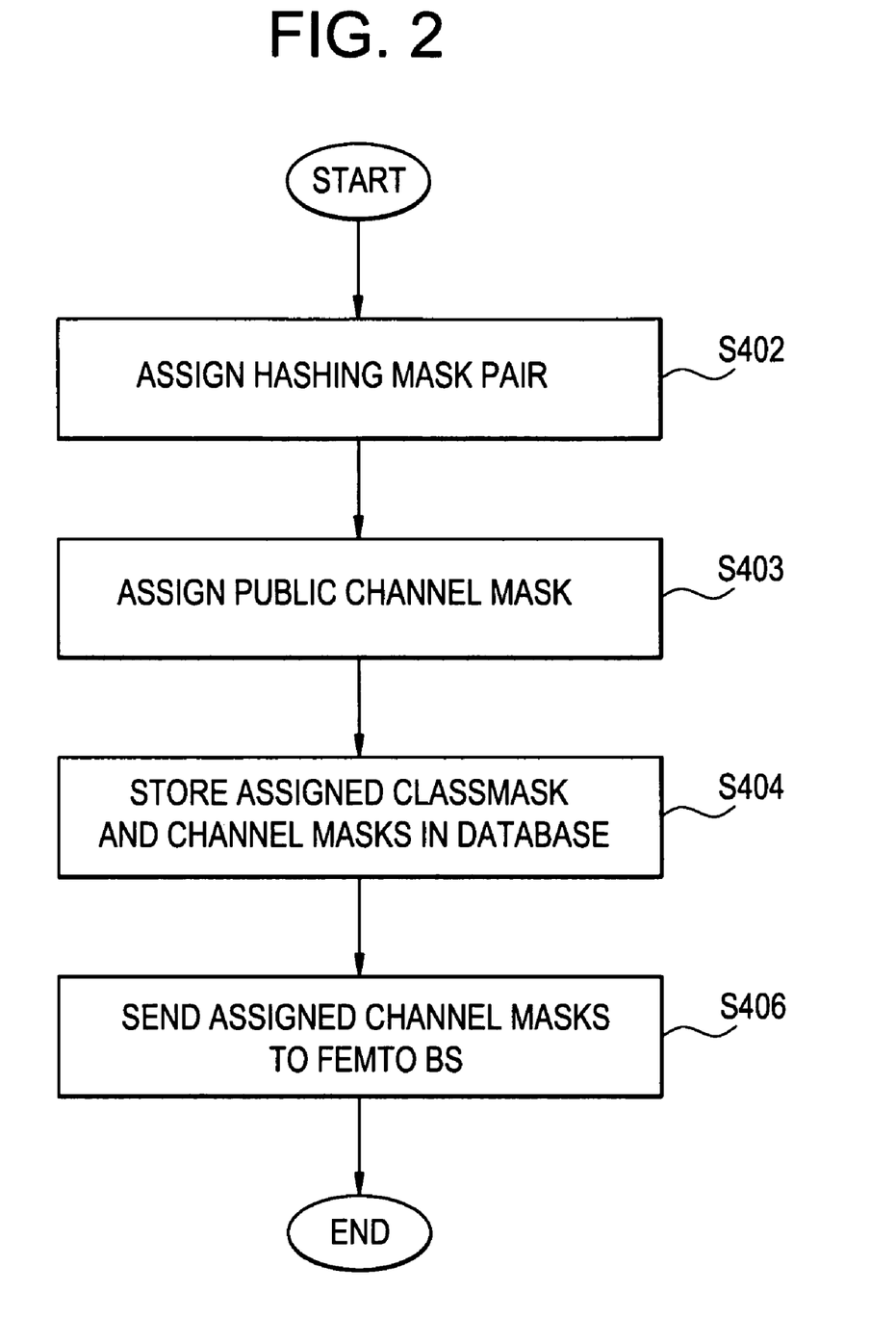
FIG. 2 is a flow chart illustrating a method for assigning hashing masks for access control to femto cells in accordance with an illustrative embodiment.
Figure 3:
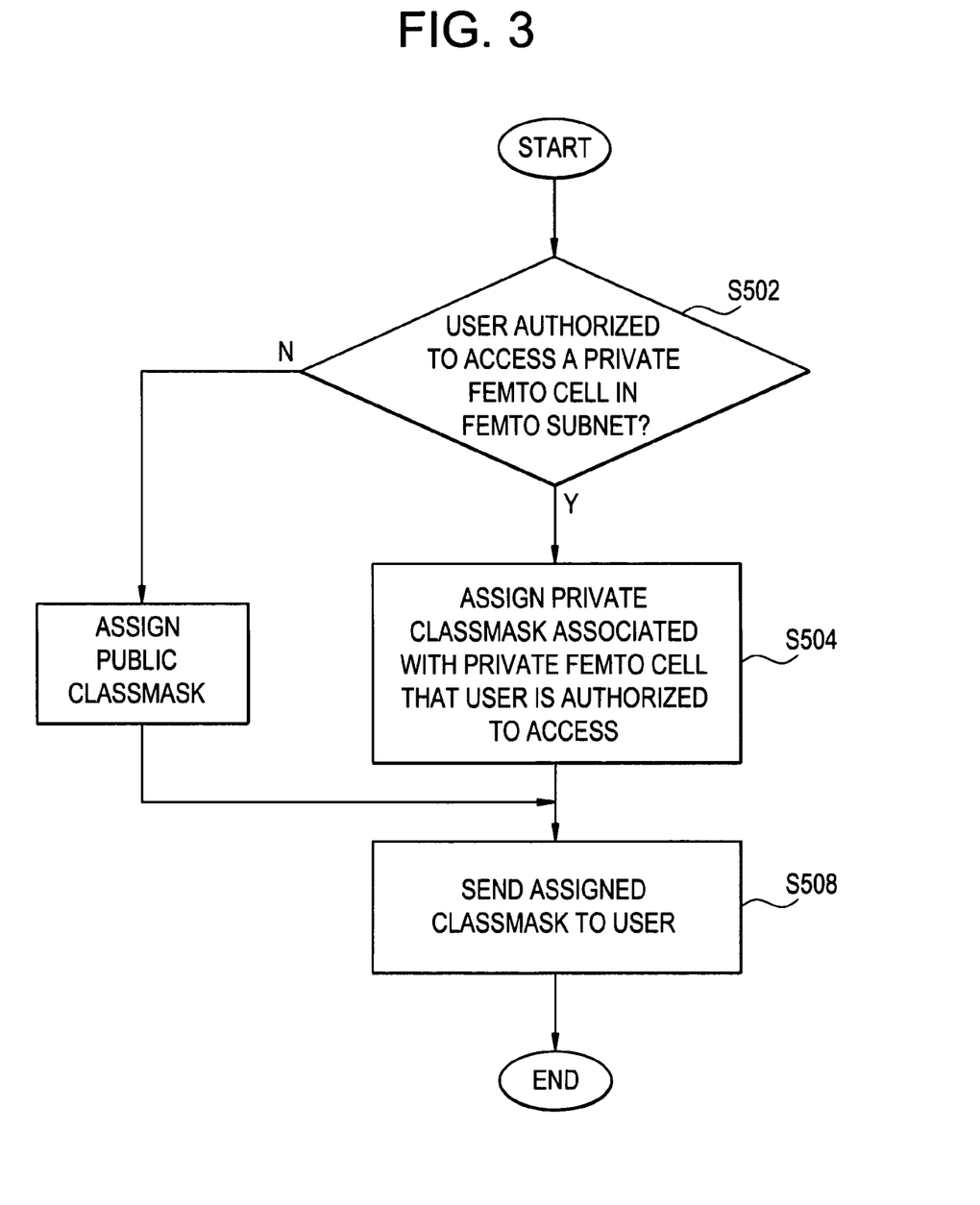
FIG. 3 is a flow chart illustrating a method for controlling access to wireless resources in a femto cell according to an illustrative embodiment.

FIGS. 2 and 3 are flow charts provided for describing methods for controlling access to wireless resources in a femto cell environment according to an illustrative embodiment. The methods shown in FIGS. 2 and 3 will be discussed with regard to the telecommunications system shown in FIG. 1, and in particular, femto base station 102A. However, it will be understood that example embodiments are equally applicable to the other femto base stations shown in FIG. 1 and to other telecommunications networks.

FIG. 2 is a flow chart illustrating a method for assigning hashing masks for controlling access to a femto cell according to an illustrative embodiment. As will be described in more detail below, according to illustrative embodiments, the RAN (e.g., by way of the FMS 100F) may build a database storing class masks and channel masks in association with user identification information. The RAN may then control access to wireless resources within one or more private femto cells based on the information stored in the database. For the purposes of this discussion, it is assumed that user A owns and administers femto base station 102A.

Referring to FIG. 2, upon being installed by an end user, femto base station 102A registers with the RAN, for example, by way of FMS 100F. In one example, during registration of the femto base station 102A, user A may specify its identification information. Identification information may include, for example, the UATI of a mobile in EVDO, mobile station identifier (MSID), etc. User A may also provide identification information for other users (e.g., mobile station 104MS) authorized to access wireless resources provided by the femto base station 102A.

In response to the identification information from user A, at step S402, the FMS 100F generates and assigns a hashing mask pair to the femto base station 102A and corresponding femto cell 100A. The hashing mask pair may include a private channel mask (e.g., an AccessHashingChannelMask in the current EVDO standard) and a private class mask (e.g., an AccessHashingClassMask in the current EVDO standard). The private channel mask may identify a channel or carrier through which an authorized user may access wireless resources within femto cell 100A. The private class mask may be used by an authorized mobile station to hash on to the channel provided by the femto base station 102A.

Concurrently or after assigning the hashing mask pair to femto base station 102A, the RAN may also identify and assign at least one public channel mask to the femto base station 102A at step S403. The public channel mask may be associated with at least one public cell located relatively close to the femto base station 102A. The public channel mask associates at least one channel or carrier through which a user may access wireless resources within the nearby public cell.

In at least one example, the RAN may assign a public channel mask associated with the public cell located closest to the femto base station 102A. The closest public cell may be a femto cell (such as femto cell 102E) or macro cell (such as macro cell 102M). For the purposes of this discussion, it is assumed that the RAN has assigned a globally common public channel mask, which is well-known.

Returning to FIG. 2, at step S404, the assigned private hashing mask pair may be stored in a database in association with the identification information of user A and identification information for femto cell 100A. Identification information for femto cell 100A may include the sector identification of the femto cell. The assigned hashing mask pair, public channel mask and identification information may be collectively referred to herein as femto access control information.

After storing the assigned femto access control information, the FMS 100F may send the assigned channel masks (e.g., public and private) to the femto base station 102A in any well-known manner at step S406. Once received, the femto base station 102A begins broadcasting the assigned channel masks and associated carriers on the broadcast control channel.

Once femto base station 102A has been configured and begins providing wireless services, when a mobile station moves across a sub-net boundary from macro subnet 12 to femto subnet 14, the RAN assigns a private class mask or a public class mask based on whether the mobile station is authorized to access a private femto cell within the femto subnet. For example, if user A moves from macro subnet 12 to femto subnet 14, the RAN assigns a private class mask associated with femto cell 102A to user A because user A is authorized to access femto cell 102A. On the other hand, if user X (not shown) moves from macro subnet 12 to femto subnet 14, the RAN assigns a public class mask to user X because user X is not associated with any private femto cell in the femto subnet 14.

FIG. 3 is a flow chart illustrating a method for assigning a class mask to a user according to an illustrative embodiment. The method in FIG. 3 will be described with regard to mobile station 104MS shown in FIG. 1.

As is well-known, each time an idle mobile station crosses a subnet border, the user sends a registration message to initiate idle handoff of the mobile between subnets. The following method may be performed in response to such a registration message generated when the mobile station 104MS crosses from, for example, macro subnet 12 to femto subnet 14.

Referring to FIG. 3, at step S502, the RAN determines whether the mobile station 104MS is authorized to access a private femto cell within the femto subnet 14. For example, in response to the registration message received from mobile station 104MS, the FMS 100F may access the above-described database storing the femto access control information to determine whether the mobile station 104MS is associated with any private femto cell within the femto subnet 14.

With respect to FIG. 1, for example, if identification information provided by the mobile station 104MS matches identification information stored in association with any of femto cells 100A, 100B, 100C or 100D, the RAN determines that the mobile station 104MS is authorized to access a private femto cell within the femto subnet 14. If the mobile station 104MS is authorized to access a private femto cell, the RAN assigns a private hashing class mask to the femto cell at S504.

For example, assuming that mobile station 104MS corresponds to user A, after determining that the mobile station 104MS is authorized to access femto cell 100A, the RAN may assign the private class mask associated with femto cell 100A to the mobile station 104MS.

At step S508, the RAN may send the assigned private class mask to the mobile station 104MS.

Assuming again that mobile station 104MS corresponds to user A, once the mobile station 104MS has received the assigned private class mask, mobile station 104MS may begin hashing on the private channel provided by private femto cell 100A when the mobile station 104MS enters femto cell 100A. The hashing calculations may be performed in any well-known manner.

Returning to step S502, if identification information provided by the mobile station 104MS does not match identification information stored in association with a private femto cell within the femto subnet 14, the RAN assigns a public class mask to the mobile station 104MS at step S504. The RAN then sends the assigned public class mask to the mobile station as described above with regard to step S508.

Upon receiving the public class mask, the mobile station 104MS may hash on public channels such as those provided by the public femto cell 100E even when the mobile station is currently located in the femto cell 100A, for example. As a result, the mobile 104MS is blocked or denied access to the femto cell 100A. As noted above, the hashing calculations may be performed in any well-known manner.

Although discussed above with regard to idle handoff, the method of FIG. 3 may be performed in response to initial registration of the mobile station. According to illustrative embodiments discussed herein, initial registration or idle handoff may occur within the mobile station's private femto cell or any other public femto cell.

A more specific example will now be described. However, it will be understood that the particular bit sequences described herein are solely for the purposes of explaining example embodiments, and not limiting in any way.

In this example, a private channel mask and a public channel mask (e.g., AccessHashingChannelMasks in the current EVDO standard) and the class mask (e.g., AccessHashingClassMask in the current EVDO standard) are defined and associated with each of femto cells 100A-100E. The assignments of the channel masks are shown in the following table 1.

TABLE 1

| AccessHashingChannelMask assigned | Description of the channel mask assignment |
|---|---|
| Private: 0000000000000001 | For femto 100A cell only accessible to user A |
| Private: 0000000000000010 | For femto cell 100B only accessible to user B |
| Private: 0100000000000000 | For the femto cell 100C only accessible to user C |
| Private: 1110000000000000 | For the 50 femto cells (represented by femto cell 100D) accessible to only a group of users D |
| Public: 1111111111111111 | All the femto cells open to public |

When users A, B, C and D (not shown) enter the femto space (e.g., upon power-up), the class mask assignment for each femto cell is specified in the following table 2. As discussed above, the class mask assignments may determined by the RAN.

TABLE 2

| AccessHashingClassMask Assigned | Description of the class mask assignment for different users |
|---|---|
| 0000000000000001 | Femto user A |
| 0000000000000010 | Femto user B |
| 0100000000000000 | Femto user C. The femto user C is assumed to own a private cell |

TABLE 2-continued

| AccessHashingClassMask Assigned | Description of the class mask assignment for different users |
|---|---|
| | in this femto space and to be a group member entitling to access the 50 group femto cells. |
| 1110000000000000 | Any user of the special group (represented by user D) who are entitled to access the 50 group femto cells entered the Femto space (or the femto sub-net) |
| 1111111111111111 | Any other users entering this femto space (or the femto sub-net) |

An example arrangement of channel masks broadcast by each of the femto cells 100A-100E may be as follows.

Femto base station 102A may broadcast access channel masks 0000000000000001 and 1111111111111111 in femto cell 100A. In addition, the base station 102A may broadcast a private channel corresponding to channel mask 0000000000000001 and a public (dummy) channel corresponding to channel mask 1111111111111111. The public or dummy channel essentially re-directs unauthorized users to hash on a public cell, such as femto cell 100E in FIG. 1.

Femto base station 102B may broadcast access channel masks 0000000000000010 and 1111111111111111 in femto cell 100B. In addition, the base station 102B may broadcast a private channel corresponding to channel mask 1000000000000010 and a public (dummy) channel corresponding to channel mask 1111111111111111.

Femto base station 102C may broadcast access channel masks 0100000000000000 and 1111111111111111 in femto cell 100C. In addition, the base station 102C may broadcast a private channel corresponding to channel mask 0100000000000000 and a public (dummy) channel corresponding to channel mask 1111111111111111.

Femto base station 102D may broadcast access channel masks 1110000000000000 and 1111111111111111 in femto cell 100C. In addition, the base station 102D may broadcast a private channel corresponding to channel mask 1110000000000000 and a public (dummy) channel corresponding to channel mask 1111111111111111.

Based on the broadcast channel masks, only users assigned a private class mask corresponding to the broadcast private channel mask is authorized to access wireless services provided by a particular private femto base station. That is, for example, only user A is capable of accessing wireless services provided by femto cell 100A because only user A is assigned a class mask corresponding to access channel mask 0000000000000001. As noted above, the users may access the wireless services in any well-known manner, for example, by hashing on a particular carrier of a particular femto cell.

If a user enters a femto cell for which it is not authorized to access the wireless resources, the user may be redirected to the nearest publicly available cell based on the dummy channel broadcast by the private femto cell.

That is, for example, when user A enters femto cell 100B, user A performs the well-known hashing calculation (e.g., a bit-wise-AND operation) on the private channel mask and the public channel mask broadcast within the femto cell 100B using the private class mask assigned to user A. The results of such a hashing operation indicate to user A that only the channel corresponding to the public channel mask is available to user A. User A then attempts to hash on the public channel or carrier corresponding to the public channel mask. As discussed above, however, the public channel is actually provided by the nearest publicly available femto cell 100E. In doing so, upon entering femto cell 100B, user A is redirected to access wireless resources of femto cell 100E, and access to femto cell 100B is thereby restricted.

According to additional illustrative embodiments, each of the class masks and channel masks may be assigned dynamically.

Figure 4:
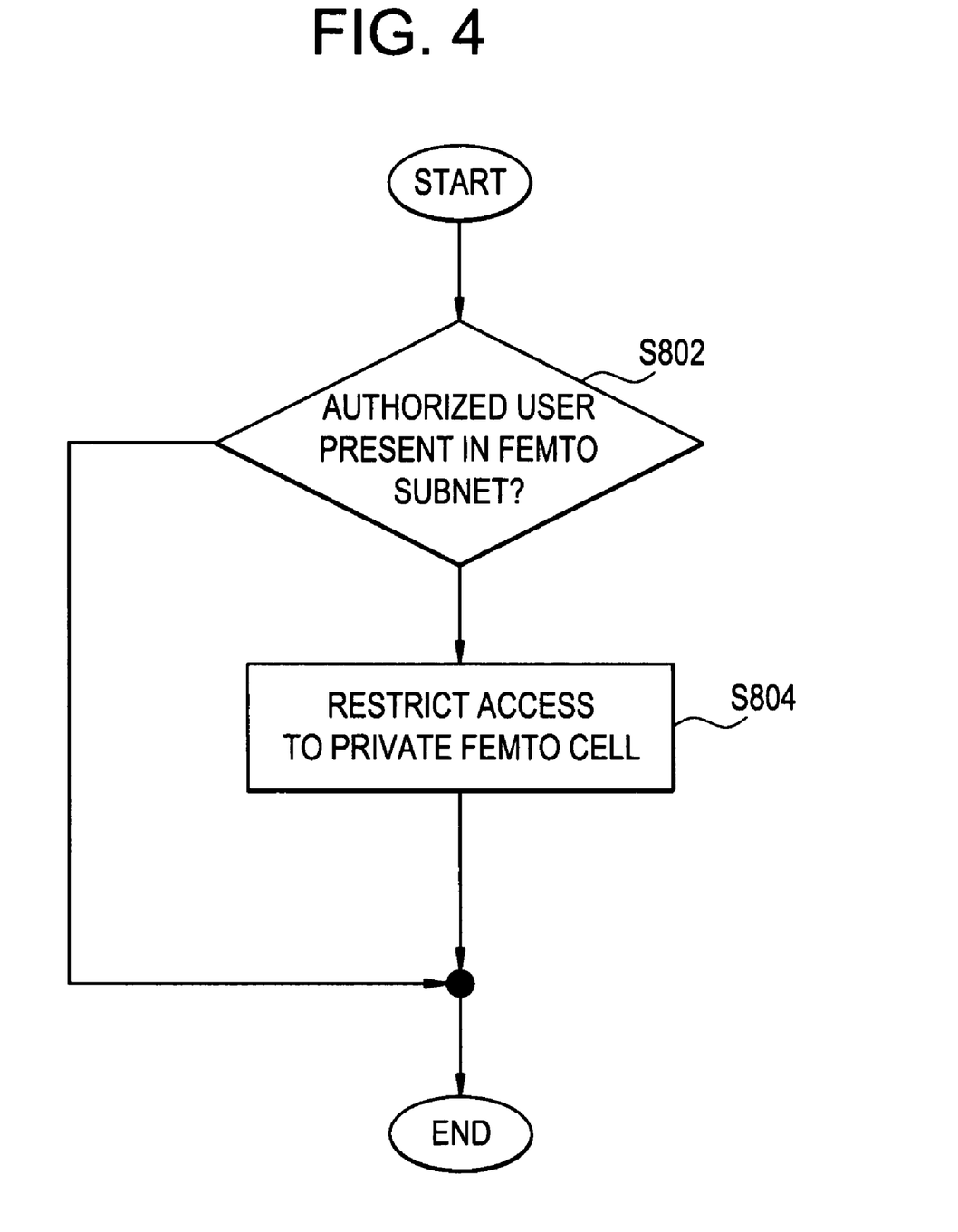
FIG. 4 is a flow chart illustrating a method for restricting access of all users to a private femto cell in a femto subnet.

FIG. 4 is a flow chart illustrating a method for restricting access to wireless resources within a femto cell. For example purposes, the method of FIG. 4 will be described with regard to FIG. 1, and in particular, with regard to mobile station 104MS as being authorized to access private femto cell 100A.

According to the method of FIG. 4, access to a private femto cell may be restricted based on whether an authorized user is present in the femto subnet in which the private femto cell is located.

As discussed above, during idle handoff of mobile station 104MS from femto subnet 14 to macro subnet 12, the RAN is notified that mobile station 104MS is no longer present in femto subnet 14. The following method may be performed in response to mobile station 104MS leaving femto subnet 14.

Referring to FIG. 4, at step S802, upon receiving notification that mobile station 104M has left femto subnet 14, the RAN may determine whether any other users authorized to access femto cell 100A are present in femto subnet 14. The RAN may do so by cross-referencing the data storing identification information for authorized users with identification information for users currently residing in the femto subnet 14.

If the RAN determines users authorized to access femto cell 100A are still present in the femto subnet 14, then no action is taken. On the other hand, if the RAN determines that no users authorized to access the femto cell 100A are present in the femto subnet 14, the RAN may dynamically reassign a null channel mask to the femto cell 100A. The null channel mask may restrict all users from accessing wireless resources provided by the femto cell 100A. In one example, the RAN may assign a channel mask 0000000000000000 to the femto cell 100A.

Class masks may also be dynamically assigned to mobile stations by the RAN. Dynamic re-assignment of channel masks may enable the RAN to reuse channel masks.

Figure 5:
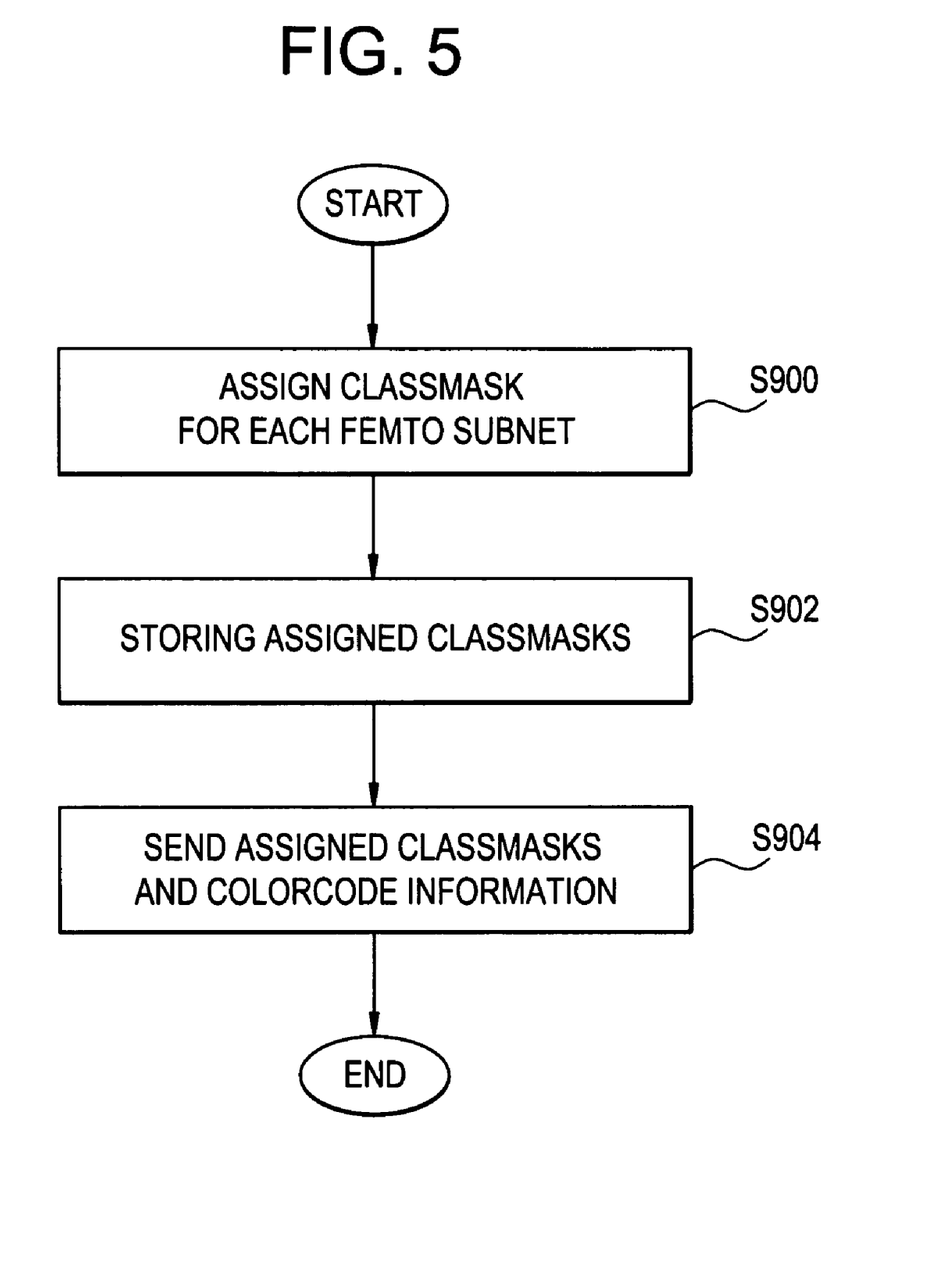
FIG. 5 is a flow chart illustrating a method for dynamically assigning class masks to a user according to another illustrative embodiment.

FIG. 5 is a flow chart illustrating a method for initially configuring class masks corresponding to all femto cells accessible to a mobile station according to an illustrative embodiment. The method of FIG. 5 may be performed at the RAN (e.g., at the FMS 100F in FIG. 1).

Referring to FIG. 5, for each femto subnet in the femto system, at step S900, the RAN may assign a private class mask or a public class masks to a mobile station based on whether the femto subnets include a private femto cell for which the mobile station is authorized to access. The assigning performed at step S900 may be performed during initial power up of the mobile station.

For example, the mobile station may be assigned a private class mask for each femto subnet including a private femto cell for which the mobile station is authorized to access. The mobile station may be assigned a public class mask for each femto subnet that does not include a private femto cell for which the mobile station is authorized to access.

At step S902, the assigned group of class masks may be stored in association with identification information for the corresponding subnet (e.g., a color code associated with each subnet).

At step S904, the stored class masks and color code information may be sent to the mobile station.

After assigning the plurality of private and public class masks, the mobile station may select one of the plurality of class masks when entering a new femto subnet.

For example, upon crossing between subnets and registering with the RAN, the mobile station may select one of the assigned class masks to use in hashing on a channel provided by the femto cell in which the mobile station resides based on a color code received in a sector-parameters message from the RAN.

In yet another illustrative embodiment, hashing channel masks may be added to or associated with a neighbor list in the sector-parameters message provided to the user. Conventionally, a "neighbor list" in the broadcast sector-parameters message lists all neighboring carriers or channels. Based on the knowledge of the channel mask assignment to the neighboring femto cells at the FMS, for example, at least one channel mask may be added to or associated with the neighbor list. The neighbor list may be periodically sent to the user. After receiving the sector-parameters message, the mobile user may conduct a hashing mask operation or calculation and then search the channels in the neighbor list to select a channel to hash on in the femto subnet based on the results of the hashing mask operation.

The invention being thus described, it will be obvious that the same may be varied in many ways. Such variations are not to be regarded as a departure from the invention, and all such modifications are intended to be included within the scope of the invention.

We claim:

1. A method for controlling access to wireless resources provided by femto cells within a femto subnet of a radio access network, the method comprising:
   establishing, by the radio access network, a hashing channel mask of a first-type and hashing class mask of the first-type for each first femto cell within the femto subnet, each hashing class mask of the first-type providing access to at least one corresponding first femto cell within the femto subnet, the hashing channel mask of the first-type indicating channels used for communication within the femto subnet; and
   assigning a hashing class mask of the first-type or a hashing class mask of a second-type to a wireless user based on whether the wireless user is authorized to access a first femto cell within the femto subnet, the hashing class mask of the first-type being associated with at least one femto cell and the hashing class mask of the first-type indicating a priority class of the wireless user, and the hashing class mask of the second-type being associated with at least one femto cell and the hashing class mask of the second-type indicating a priority class of the wireless user.

2. The method of claim 1, further comprising:
   storing, in a database within the radio access network, each established hashing channel mask of the first-type and hashing class mask of the first-type in association with identification information for wireless users authorized to access the femto cell and in association with identification information for the first femto cell.

3. The method of claim 2, further comprising:
   transmitting each assigned hashing channel mask of the first-type to a corresponding femto base station.

4. The method of claim 3, further comprising:
   broadcasting, by each femto base station, the corresponding established hashing channel mask of the first-type and a hashing channel mask of the second-type on a broadcast control channel to wireless users, the hashing channel of the second-type mask being indicative of a channel provided by a cell of the second-type within the femto subnet.

5. The method of claim 4, wherein the cell of the second-type is a macro or a femto cell.

6. The method of claim 1, wherein the assigning step further comprises:
   determining whether a wireless user is authorized to access at least one first femto cell in the femto subnet based on identification information received from the wireless user; and
   associating a class mask with the wireless user based on the determining step.

7. The method of claim 6, wherein the determining step is performed in response to initial registration or idle handoff of the wireless user.

8. The method of claim 6, wherein the determining step determines the wireless user is authorized to access at least one first femto cell if the wireless user's identification information matches authorized wireless user identification information stored in a database within the radio access network, the authorized wireless user identification information being stored in association with identification information for the first femto cell.

9. The method of claim 8, wherein if the determining step determines that the wireless user is not authorized to access at least one first femto cell, the network assigns a hashing class mask of the second-type to the wireless user.

10. The method of claim 9, wherein if the determining step determines that the wireless user is authorized to access at least one first femto cell, the network assigns a hashing class mask of the first-type to the wireless user, the hashing class mask of the first-type being associated with the at least one first femto cell.

11. The method of claim 10, further comprising:
    transmitting the assigned hashing class mask to the wireless user.

12. The method of claim 1, wherein the at least one hashing channel mask of the first-type is provided to the wireless user in association with a neighbor list.

13. A method for controlling access to wireless resources within a femto cell of a radio access network, the method comprising:
    establishing, by the radio access network, a hashing mask pair of a first-type for a first femto cell, the hashing mask pair of the first-type including a hashing channel mask of the first-type and corresponding hashing class mask of the first-type;
    providing, by the radio access network, a hashing channel mask of a second-type for the first femto cell;
    storing, within the radio access network, the hashing mask pair of the first-type and the channel hashing mask of the second-type in association with identification information for the femto cell; and
    assigning one of the class hashing mask of the first-type and a class hashing mask of the second-type to a wireless user.

14. The method of claim 13, further comprising:
    broadcasting the hashing channel mask of the first-type, the hashing channel mask of the second-type and associated channels on a broadcast control channel to wireless users in the first femto cell.

15. The method of claim 13, wherein the controlling step further comprises:
    determining whether the wireless user is authorized to access the first femto cell based on identification information received from the wireless user; and assigning the hashing class mask of the first-type to the wireless user based on the determining step.

16. The method of claim 15, wherein the determining step determines the wireless user is authorized to access the first femto cell if the wireless user's identification information matches authorized wireless user identification information stored in a database within the radio access network, the authorized wireless user identification information being stored in association with identification information for the first femto cell.

17. The method of claim 15, wherein if the determining step determines that the wireless user is not authorized to access the first femto cell, the network assigns the hashing class mask of the second-type to the wireless user.

18. The method of claim 17, wherein if the determining step determines that the wireless user is authorized to access the first femto cell, the network assigns the hashing class mask of the first-type to the wireless user.

19. A method for restricting access to a first femto cell in a femto subnet, the method comprising:
    determining whether a wireless user authorized to access the first femto cell is present in the femto subnet; and
    restricting access to the first femto cell by assigning a null hashing channel mask to the first femto cell.

20. A method controlling access to wireless resources within a radio access network, the method comprising:
    establishing, by the radio access network, a hashing channel mask of a first-type and hashing class mask of the first-type for each first femto cell within each femto subnet of a femto system, each hashing class mask of the first-type providing access to at least one corresponding first femto cell;
    assigning a plurality of the hashing class masks to a wireless user, each of the plurality of hashing class masks being associated with a femto subnet within a femto system;
    storing the assigned hashing class masks in association with corresponding femto subnet identifiers; and
    sending the assigned hashing class masks and corresponding femto subnet identifiers to the wireless user.

21. The method of claim 20, wherein the femto subnet identifiers are color codes.

22. The method of claim 20, wherein when the wireless user moves to a femto subnet, the wireless user selects one of the plurality of hashing class masks based on a femto subnet identifier received from the radio access network.

* * * * *